United States Patent
Herntier

(10) Patent No.: US 9,481,400 B2
(45) Date of Patent: Nov. 1, 2016

(54) BODY STRUCTURE FOR A FLOOR OF A MOTOR VEHICLE BODY

(71) Applicant: Dr. Ing. h.c. F. Porsche Aktiengesellschaft, Stuttgart (DE)

(72) Inventor: Matthias Herntier, Friolzheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/819,912

(22) Filed: Aug. 6, 2015

(65) Prior Publication Data
US 2016/0046329 A1  Feb. 18, 2016

(30) Foreign Application Priority Data

Aug. 13, 2014 (DE) .......... 10 2014 111 595

(51) Int. Cl.
| | |
|---|---|
| *B60J 7/00* | (2006.01) |
| *B62D 25/20* | (2006.01) |
| *B62D 21/02* | (2006.01) |
| *B62D 29/00* | (2006.01) |
| *B62D 29/04* | (2006.01) |
| *B62D 27/02* | (2006.01) |

(52) U.S. Cl.
CPC .............. *B62D 25/20* (2013.01); *B62D 21/02* (2013.01); *B62D 27/026* (2013.01); *B62D 29/008* (2013.01); *B62D 29/041* (2013.01)

(58) Field of Classification Search
CPC . B29C 66/71; B29C 47/0019; B29C 47/003; B29C 66/02245; B29K 2067/00; E04F 15/02; E04F 15/02038; E04F 2201/0115; E04F 2201/0138; E04F 2201/0153

USPC ............. 296/193.07, 191, 203.01, 204; 1/1; 24/DIG. 50
See application file for complete search history.

(56) References Cited

U.S. PATENT DOCUMENTS

| | | | | |
|---|---|---|---|---|
| 4,196,948 A | * | 4/1980 | Gavel ................. | A47B 88/044 312/107 |
| 4,375,381 A | * | 3/1983 | Carlson .................. | F16L 11/16 156/195 |
| 5,052,164 A | * | 10/1991 | Sandow .................. | E04C 2/543 52/306 |
| 5,267,515 A | * | 12/1993 | Tsuruda ............... | B61D 17/041 105/397 |
| 5,485,934 A | * | 1/1996 | Holztrager ............ | A47F 5/0846 211/126.2 |
| 5,509,734 A | * | 4/1996 | Ausnit ............... | B65D 33/2558 24/DIG. 5 |
| 5,558,613 A | * | 9/1996 | Tilman ............... | B65D 33/2541 493/212 |

(Continued)

FOREIGN PATENT DOCUMENTS

| | | |
|---|---|---|
| DE | 9409059 | 8/1994 |
| DE | 102006025816 | 12/2007 |

*Primary Examiner* — Kiran B Patel
(74) *Attorney, Agent, or Firm* — Gerald E. Hespos; Michael J. Porco; Matthew T. Hespos

(57) ABSTRACT

The floor of a vehicle has two planar extruded profiles, located one on top of the other and having opposing T-shaped ribs rotated through 90 degrees with respect to one another. T-shaped recesses are introduced into ribs of one profile, and crosspieces on T-shaped ribs of the opposite extruded profile engaging in an interlocking manner. The extruded profiles are pushed into one another for connection, and a foam is introduced beforehand into the cavities between the ribs. The foam is foamed up so that the two extruded profiles are connected in an adhesively bonded manner.

9 Claims, 2 Drawing Sheets

(56) References Cited

U.S. PATENT DOCUMENTS

| | | | | |
|---|---|---|---|---|
| 7,264,305 B2* | 9/2007 | Kuriakose | B62D 33/02 | |
| | | | 296/193.07 | |
| 7,281,685 B2* | 10/2007 | Schoene | B64D 11/0696 | |
| | | | 244/118.6 | |
| 7,596,924 B2* | 10/2009 | Sakae | B62D 25/06 | |
| | | | 296/155 | |
| 7,669,384 B2* | 3/2010 | Kaida | B21C 23/10 | |
| | | | 29/897.2 | |
| 8,057,143 B2* | 11/2011 | Adams | B60P 7/0815 | |
| | | | 296/184.1 | |
| 8,544,232 B2* | 10/2013 | Wybo | B29C 47/0019 | |
| | | | 52/588.1 | |
| 8,714,633 B2* | 5/2014 | Wary | B32B 3/02 | |
| | | | 296/184.1 | |
| 9,010,051 B2* | 4/2015 | Mackintosh | E01C 9/10 | |
| | | | 119/450 | |
| 9,056,580 B2* | 6/2015 | Baldsiefen | B60Q 3/06 | |
| 9,166,521 B2* | 10/2015 | Durney | F24J 2/5232 | |
| 9,312,411 B2* | 4/2016 | Laurin | E04B 1/61 | |
| 9,359,015 B2* | 6/2016 | Evans | E05D 5/0238 | |

* cited by examiner

BODY STRUCTURE FOR A FLOOR OF A MOTOR VEHICLE BODY

CROSS REFERENCE TO RELATED APPLICATION

This application claims priority under 35 USC 119 to German Patent Appl. No. 10 2014 111 595.3 filed on Aug. 13, 2014, the entire disclosure of which is incorporated herein by reference.

BACKGROUND

1. Field of the Invention. The invention relates to a body structure for a floor of a motor vehicle body.

2. Description of the Related Art. DE 10 2006 025 816 A1 discloses a floor structure for a motor vehicle body. The floor structure has a planar sandwich component at least in one load-bearing region. The sandwich component has a metal foam between two metal sheets. Furthermore, DE 94 09 059.9 U1 discloses a profile strip for loading space floors of transport vehicles. The profile strip has an open, undercut anchoring groove with an inverted T profile in which connection members of straps or locking beams are fixed.

It is the object of the invention to create a body structure for a floor of a motor vehicle body with sandwich components that have stability in all directions and additionally have a sound-absorbing effect.

SUMMARY

The invention relates to a simple way of connecting two panel-like extruded profiles with foam located therebetween. The invention also relates to a stable motor vehicle floor that ensures optimal stability both in the longitudinal direction and in the transverse direction. The sandwich component may comprise two panel-like extruded profiles that are located one on top of the other in a connecting position and that have opposing T-shaped ribs that are rotated through 90 degrees with respect to one another and are connected together in the connecting position via corresponding interlocking structure provided on the T-shaped ribs.

A foam, a metal foam or a honeycomb structure may be introduced into cavities between the panel-like extruded profiles to achieve sound absorption. The foam may be introduced and foamed up before the connecting position is taken up.

The panel-like extruded profile located on top may have continuous T-shaped ribs that extend longitudinally with respect to the vehicle, and the panel-like extruded profile located underneath may have continuous transversely extending T-shaped ribs that are rotated 90 degrees with respect to longitudinally extending T-shaped ribs. The longitudinally extending T-shaped ribs of the extruded profile located on top may project down and each may have a crosspiece at the end of the ribs to function as interlocking means for connecting the two panel-like extruded profiles together in an interlocking manner.

The transversely extending ribs of the extruded profile located underneath may have T-shaped recesses for receiving the crosspieces of the longitudinally extending ribs in an interlocked manner as further interlocking means for taking up the connecting position.

The interlocking of the crosspieces of the T-shaped ribs of the extruded profile on top in the T-shaped recesses in the opposite ribs of the extruded profile located underneath achieves a firm connection between the two panel-like extruded profiles. The foam introduced between the two extruded profiles also achieves an adhesive bonding between the two panel-like extruded profiles.

The panel-like extruded profiles are displaced with respect to one another so that the crosspieces of the T-shaped ribs are insertable into the T-shaped recesses in the ribs to take up the connecting position. As a result, an interlocking connection between the two panel-like extruded profiles can be produced in a simple manner.

The panel-like extruded profiles that form the sandwich components may extend across the width of the vehicle and may be arranged in a manner plugged or inserted laterally into cross members and/or seat and heel supports. A number of the sandwich components may form the floor panels of the floor for the vehicle.

An exemplary embodiment of the invention is illustrated in the drawings and is described in more detail in the following text.

DETAILED DESCRIPTION

Figure 1:
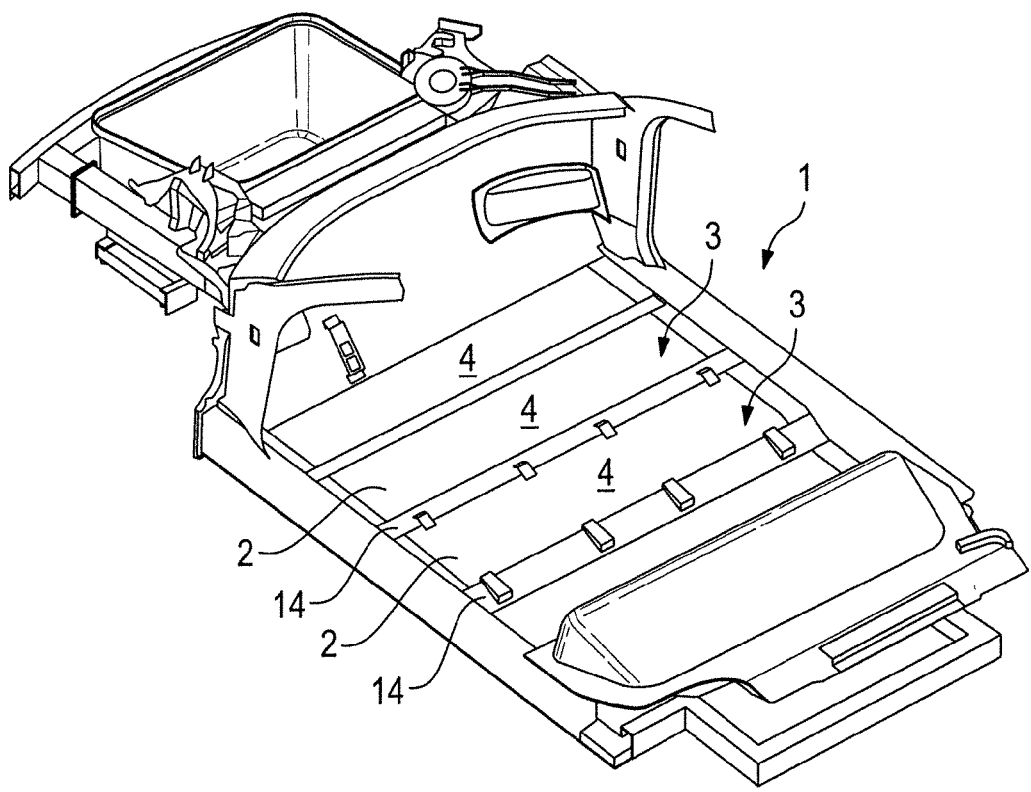
FIG. 1 is a view of a body structure for a floor of a motor vehicle with panel-like extruded profiles as floor panels.
Figure 2:
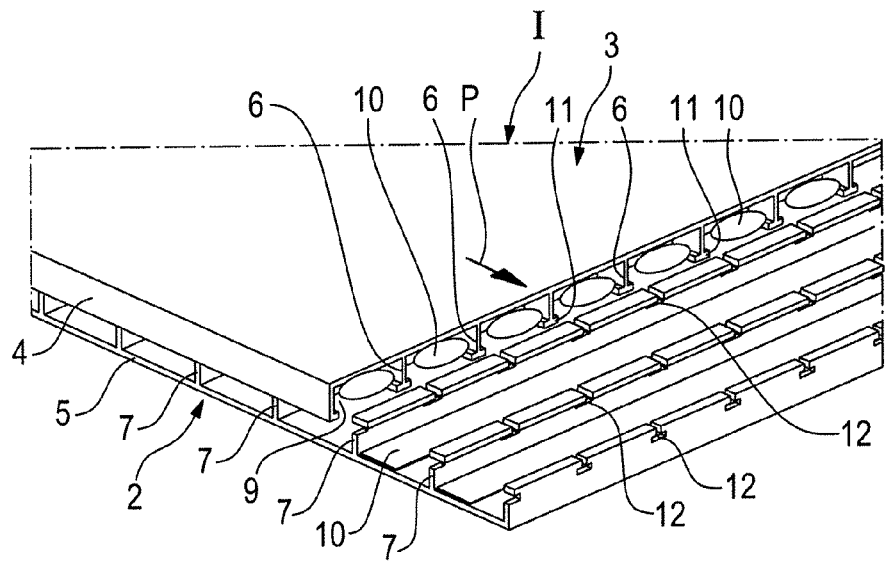
FIG. 2 is a diagrammatic illustration of the panel-like extruded profiles as floor panels with an interlocking connection between the T-shaped ribs of the extruded profiles.

A body structure 1 for a floor of a vehicle body has planar sandwich components 2 that form floor panels 3. The sandwich components 2 each comprise two panel-like extruded profiles 4, 5 located one on top of the other in a connecting position I. The extruded profiles 4, 5 have opposing T-shaped ribs 6, 7 arranged in a manner rotated through 90° with respect to one another as shown in FIG. 2. In the connecting position I, the T-shaped ribs 6, 7 are connected together via interlocking means 11, 12.

A foam 10 is introduced between the panel-like extruded profiles 4, 5 and into cavities 9 between the T-shaped ribs 6, 7. The foam 10 is foamed up to achieve adhesive bonding of the two extruded profiles 4, 5.

The panel-like extruded profile 4 on top has continuous T-shaped ribs 6 that extend longitudinally with respect to the vehicle, and the panel-like extruded profile 5 located underneath has continuous T-shaped ribs 7 that extend orthogonal to the longitudinally extending T-shaped ribs 6.

The longitudinally extending T-shaped ribs 6 of the extruded profile 4 located on top are oriented down and each has a crosspiece 11 as an interlocking means at the end of the rib 6. Each crosspiece 11, in the connecting position I, engages in a T-shaped recess 12 in the transversely extending T-shaped rib 7 of the extruded profile 5 located underneath and is received in a form-fitting matter therein. The crosspieces 11 and the T-shaped recesses 12 in the T-shaped ribs 6, 7 each form the corresponding interlocking means on the extruded profiles 4, 5.

The extruded profiles 4, 5 also can be associated with one another so that the extruded profile 4 is located underneath and the extruded profile 5 is on top.

The extruded profiles 4, 5 preferably are connected together by a displacement movement of the extruded profile 4 located on top in the arrow direction P onto the extruded profile 5 located underneath, as is illustrated in more detail in FIG. 2. During the displacement operation, the extruded profiles 4, 5 are guided via the crosspieces 11 into the T-shaped recesses 12, so that the two extruded profiles 4, 5 can be spaced apart from one another exactly.

The motor vehicle floor panels 3 formed from the extruded profiles 4, 5 have high stability in all directions, since the T-shaped ribs 6, 7 extend both in the longitudinal direction and in the transverse direction and are connected together in a multiple interlocked manner via the means 11, 12, and in addition foam 10 introduced into the cavities 9 has a further supporting effect.

Figure 3:
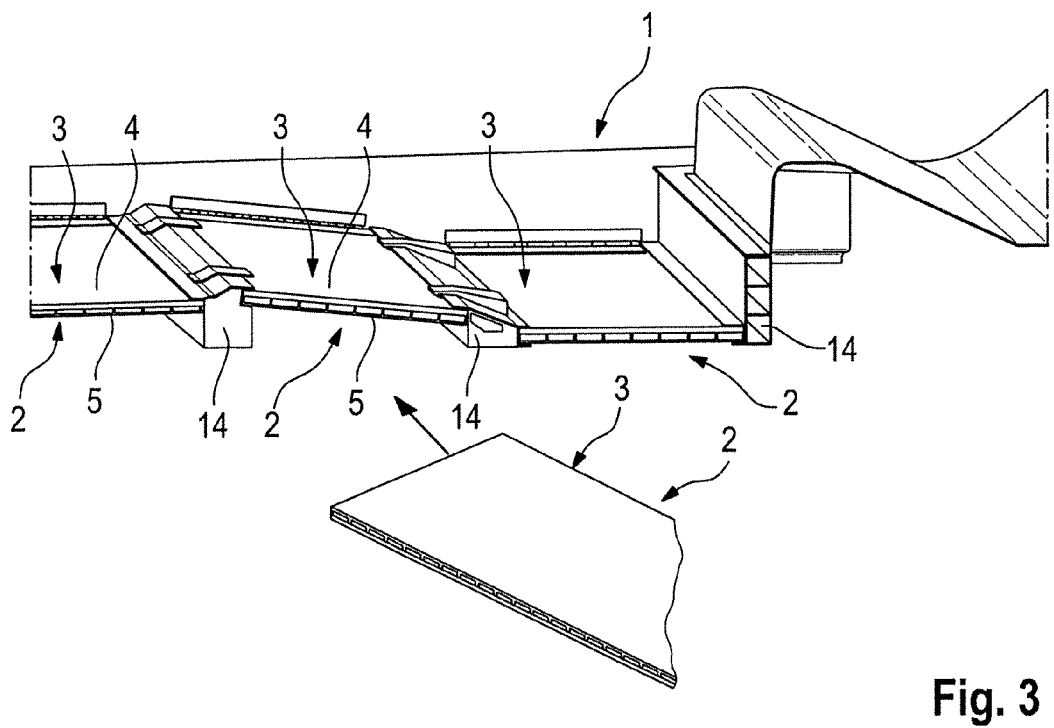
FIG. 3 shows the floor panels retained in cross members.

As is shown in FIG. 3, the panel-like extruded profiles 4, 5 that form the sandwich components 2 and which extend across the width of the vehicle and are plugged or inserted laterally into cross members 14 and/or seat and heel supports. A number of sandwich components 2 form the floor panels 3 for the floor of the motor vehicle.

The application of the floor panels 3 embodied as sandwich components 2 can be used both for vehicles without a central tunnel and for vehicles with a central tunnel. The sandwich components 2 can also be used in other regions of the vehicle and a restriction only to floor panels of a vehicle is not intended according to the invention.

What is claimed is:

1. A body structure for a floor of a vehicle body, comprising: planar sandwich components as floor panels, each sandwich component having first and second panel-like extruded profiles located one on top of the other in a connecting position and formed respectively with arrays of first and second opposing T-shaped ribs, the first T-shaped ribs being parallel to one another, the second T-shaped ribs being parallel to one another and orthogonal to the first T-shaped ribs, the first T-shaped ribs being connected to the second T-shaped ribs in the connecting position by interlocking elements on the T-shaped ribs.

2. The body structure of claim 1, wherein the panel-like extruded profiles have a foam, a metal foam or a honeycomb structure in cavities between the T-shaped ribs.

3. The body structure of claim 2, wherein the first panel-like extruded profile is located on top of the second panel-like extruded profile and the first T-shaped ribs extend parallel to a longitudinal direction of the vehicle, the second panel-like extruded profile being located underneath the first panel-like extruded profile and the second T-shaped ribs extending in a transverse direction of the vehicle.

4. The body structure of claim 2, wherein the first T-shaped ribs of the extruded profile are located on top of the second T-shaped ribs and are oriented down, the first T-shaped ribs having crosspieces as the interlocking elements at ends of the first T-shaped ribs.

5. The body structure of claim 4, wherein the second T-shaped ribs have T-shaped recesses as the interlocking elements, the crosspiece being received in the recesses in an interlocked manner to achieve the connecting position between the two panel-like extruded profiles.

6. The body structure of claim 5, wherein the panel-like extruded profiles are displaceable with respect to one another to engage the crosspieces of the first T-shaped ribs into the T-shaped recesses in the second T-shaped ribs.

7. The body structure of claim 2, wherein the first extruded profile is below the second extruded profile.

8. The body structure of claim 2, wherein the foam is introducible into the cavities between the T-shaped ribs of the two extruded profiles before the connecting position is taken up.

9. The body structure of claim 1, wherein the panel-like extruded profiles that form the sandwich components extend at least across the width of the vehicle and are plugged laterally into cross members and/or seat and heel supports, and a number of sandwich components form the floor panels of the vehicle.

* * * * *